United States Patent [19]

Iseman

[11] Patent Number: 4,793,440
[45] Date of Patent: Dec. 27, 1988

[54] LIQUID LUBRICANT SUMP LEVEL MANAGEMENT SYSTEM

[75] Inventor: Walter J. Iseman, Monroe Center, Ill.

[73] Assignee: Sundstrand Corporation, Rockford, Ill.

[21] Appl. No.: 134,707

[22] Filed: Dec. 18, 1987

[51] Int. Cl.⁴ ............................................. F01M 11/08
[52] U.S. Cl. ................................... 184/6.23; 137/386; 137/393; 184/103.1; 210/188
[58] Field of Search ................. 184/6.23, 103.1, 103.2; 55/52, 55, 199; 210/188, 787, 789; 137/386, 393

[56] References Cited

U.S. PATENT DOCUMENTS

| | | | |
|---|---|---|---|
| 2,024,336 | 12/1935 | Cavanaugh | 184/6.23 |
| 2,081,315 | 5/1937 | Weber . | |
| 2,373,349 | 4/1945 | Serrell . | |
| 2,432,130 | 12/1947 | Serrell et al. | 184/6.23 X |
| 2,453,602 | 11/1948 | Strickler, Jr. et al. | 184/6.23 X |
| 2,725,956 | 12/1955 | Cunningham | 184/6.23 |
| 2,747,514 | 5/1956 | Edwards | 184/6.23 |
| 2,888,097 | 5/1959 | Scheffler, Jr. . | |
| 3,151,702 | 10/1964 | Matt . | |
| 3,378,104 | 4/1968 | Venable | 55/52 X |
| 3,458,011 | 7/1969 | Dwyer . | |
| 4,511,016 | 4/1985 | Duell | 184/6.23 X |

FOREIGN PATENT DOCUMENTS 905642 12/1945 France ............................... 184/6.23

Primary Examiner—Leonard E. Smith
Attorney, Agent, or Firm—Wood, Dalton, Phillips, Mason & Rowe

[57] ABSTRACT

A liquid lubricant sump level management system which includes a scavenge pump circuit communicating with the lubricant sump. A centrifugal deaerator is provided in the circuit. A liquid reservoir is in liquid communication with the deaerator. A sensor is operatively associated with the deaerator for sensing the liquid level condition in the deaerator, and providing for passage of liquid from the deaerator to the reservoir in response to a high liquid level condition and for passage of liquid from the reservoir to the deaerator in response to a low liquid level condition.

15 Claims, 3 Drawing Sheets

LIQUID LUBRICANT SUMP LEVEL MANAGEMENT SYSTEM

FIELD OF THE INVENTION

This invention generally relates to lubricating systems and, particularly, to a system for managing the lubricant level in a moving component compartment, such as a gear housing, an integrated drive generator or the like.

BACKGROUND OF THE INVENTION

In many applications, lubricant, such as oil, is used to lubricate moving components such as gears. It often is desirable to control the level of oil within a gear housing or case surrounding tee lubricated components. The level or amount of lubricant in the housing is important and, sometimes critical. Lubricant may have to be periodically or continuously replenished. Or, the volume of lubricant may simply vary during use.

For instance, when the ambient temperature surrounding lubricated components varies significantly, this temperature variation can cause significant expansion of the lubricating oil, causing lubricant management problems because of the varying volume of oil within the lubricating system. It is desirable to regulate the lubricant level within specified containment of lubricated components notwithstanding significant changes in lubricant volume, such as that caused by temperature variations.

Many lubricating systems also incorporate a deaerating system somewhere in the system whereby air entrapped in the lubricating liquid, such as oil, is separated. There are a variety of deaerating devices, but the most common is a centrifugal deaerating device which separates the heavier oil from the lighter air by centrifugal action, such as by a rotating chamber having a radially outwardly disposed liquid outlet.

In order to manage the lubricant level in systems of the character described above, some sort of means must be employed to drain excess lubricant from the cavity surrounding the lubricated components and transport the excess lubricant to a reservoir, for instance, where it might be stored until it is needed to be resupplied to the cavity when the lubricant level drops below a preselected level.

This invention is directed to a novel concept of utilizing the oil level in a centrifugal deaerator as a signal to divert, or add, liquid from the working circuit of the operative components to maintain an appropriate working lubricant level around the components. This approach eliminates any variety of additional devices, and the deaerator itself is used to signal and/or sense the need for or excess of lubricant in the system.

SUMMARY OF THE INVENTION

An object, therefore, of the invention is to provide a new and improved liquid lubricant sump level management system of the character described.

In an exemplary embodiment of the invention, the system includes a scavenging circuit communicating with the lubricant sump. Centrifugal deaerator means are provided in the circuit. Liquid reservoir means are provided in liquid communication with the deaerator means. Sensing means are operatively associated with the deaerator means for sensing the liquid level condition therein. The sensing means provides for passage of liquid from the deaerator means to the reservoir means in response to a high level condition, and for passage of liquid from the reservoir means to the deaerator means in response to a low level condition.

In one form of the invention, the liquid reservoir means is pressurized, as by a spring loaded diaphragm-type reservoir. Alternate forms of sensing means are shown, including a differential pressure valve in-line between the deaerator means and the reservoir means. Alternatively, the sensing means can include a liquid outlet in the centrifugal deaerator means at a given radial location to determine the liquid accumulation level of the deaerator means.

In a further form of the invention, the reservoir means is non-pressurized, and an ejector means is provided in liquid communication between the reservoir means and the deaerator means for supplying liquid from the reservoir means back to the deaerator means. The ejector means is in communication with a liquid outlet of the deaerator means so as to be continuously powered by the pressurized liquid from the deaerator means. In essence, the sensing means and the ejector means are in a closed loop liquid circuit including the reservoir means and the deaerator means.

Other objects and features of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
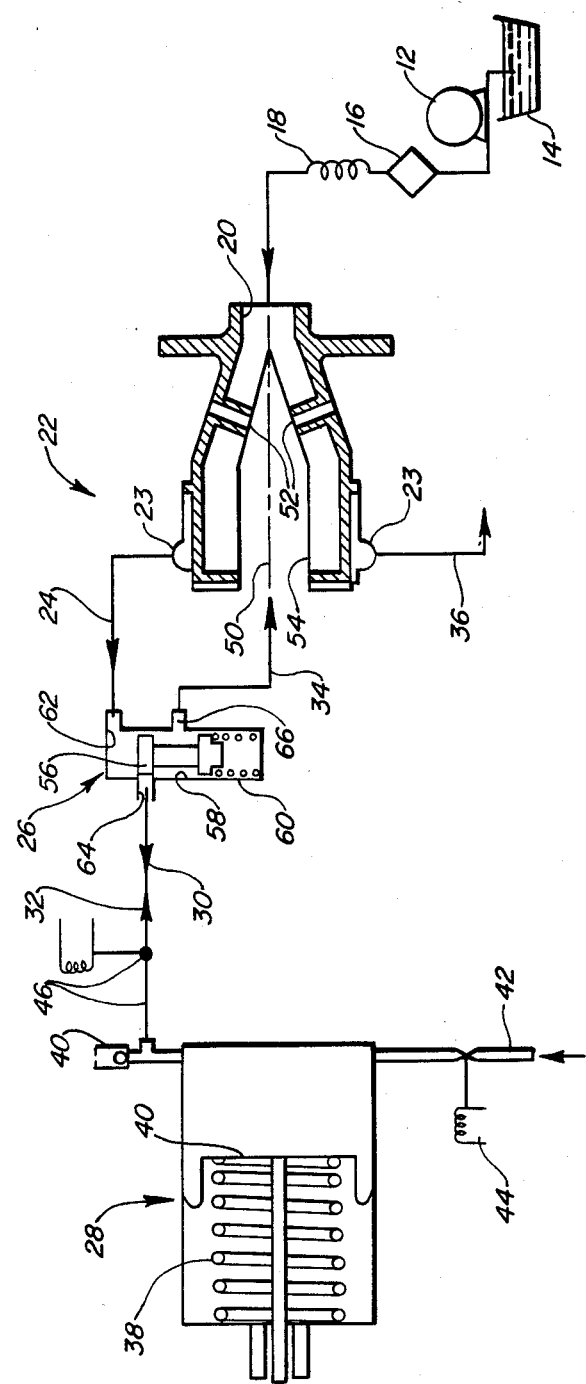
FIG. 1 is a schematic illustration of one embodiment of the liquid lubricant sump level management system of the invention.

Referring to the drawings generally, the invention involves the use of a reservoir to contain excess oil or other lubricating liquid from a liquid lubricant sump, the sump being associated with a housing, casing or the like which is associated with moving components, such as gears, to be lubricated. The system is directed to controlling the oil level of the sump which is used to lubricate the moving components. The system drains excess oil from the sump for storage until it is needed to resupply the sump when the oil level drops below a preselected level. Generally, such systems are known in various arts, such as lubricating various gear mechanisms, integrated drive generators or the like.

Referring to the drawings in greater detail, and first to FIG. 1, a scavenge pump 12 is used to draw oil from a sump 14 which may be the bottom of a cavity within a housing containing the lubricated components. This is common in many systems to maintain a preselected oil level. Lubricating oil from sump 14 is directed through a filter 16 and a heat exchanger 18 to an inlet 20 of a deaerator, generally designated 22. The deaerator has peripheral outlet means 23.

Continuing through the system, the deaerated oil is directed by a conduit 24 through a differential pressure valve generally designated 26, and to a reservoir or accumulator, generally designated 28. This is the flow path for excess oil from sump 14 to reservoir 28, as indicated by arrow 30.

If lubricating oil is needed to replenish the liquid lubricant sump system, a reverse flow of fluid, as indicated by arrow 32, goes back from reservoir 28 to differential pressure valve 26, and then through a conduit 34 back to deaerator 22. A lubricant and/or cooling circuit 36 leads from outlet 23 of deaerator 22 back to the lubricating system for the moving components.

Reservoir 28 is shown as a pressurized accumulator in that it is spring loaded by a spring 38 acting on a movable wall or flexible diaphragm 40 to exert a pressure back in the direction of return or reverse fluid flow. The reservoir may include a gas vent 40. A fill circuit 42, including a fill solenoid 44, also might be included because most systems involving the lubrication of moving parts has at least some leakage whereby some amount of lubricant must be added to the overall system. Further, a shutoff solenoid also might be added to conduit 46 between differential pressure valve 26 and reservoir 28. The solenoid valve would be used to trap pressurized fluid in the event of a shutdown. As will be understood hereinafter, the differential pressure valve acts as a sensing means for sensing the liquid level condition in the deaerator and providing for passage of liquid to or from the reservoir as required.

The invention contemplates the novel use of deaerator 22 as a pump which has the capability of reacting to the quantity of liquid drawn from sump 14, in conjunction with differential pressure valve 26 which senses the level condition of the deaerator.

More particularly, deaerator 22 is shown somewhat schematically, but comprises a centrifugal-type deaerator which separates the oil from entrapped air by centrifugal force, as the oil is heavier than the air. The rotating cavity portion of the deaerator rotates about axis 50. Radially inwardly directed outlet ports 52 are provided for the evacuation of separated air. The oil level within deaerator 22 is illustrated at 54.

Differential pressure valve 26 is of a piston/cylinder-type, including a piston 56 within a cylinder 58. The piston is loaded by a spring 60. A liquid/oil inlet 62 to cylinder 58 is in communication with conduit 24 from outlet 23 of the deaerator. An outlet 64 of the cylinder is in communication with conduit 46 leading to reservoir 28. In essence, this defines the flow path for excess oil from the sump to the reservoir. Cylinder 58 of the differential pressure valve also has an outlet 66 in communication with conduit 34 leading back to deaerator 22. This defines the return flow path for the liquid lubricant needed to replenish the lubricating system for the moving components. It can be seen that inlet 62 and outlet 66 are spaced on opposite sides of piston 56, and outlet/inlet 64 to and from reservoir 28 is located intermediate inlet 62 and outlet 66. Therefore, it is apparent that the direction of flow depends on the position of piston 56 on either side of outlet 64. If the piston is below the outlet, as viewed in FIG. 1, liquid can flow through conduit 24 from the deaerator to the reservoir. If the piston is above outlet 64, as viewed in FIG. 1, liquid can flow through conduit 34 from the reservoir back to the deaerator.

As stated above, differential pressure valve 26 acts as a sensing means in conjunction with the deaerator to sense the liquid level condition therein. This is determined by the spring force of spring 60. As can be understood, the amount of oil in deaerator 22, i.e. liquid level 54, determines the pressure within the deaerator. The more the liquid, the higher the level, and thereby the greater is the pressure within the deaerator. The liquid level, i.e. pressure, within the deaerator which would cause the liquid to flow from the deaerator to the reservoir is determined by spring 60, and vice versa for the return flow.

From the foregoing, it can be understood that if the pressure in deaerator 22 rises above a preselected threshold (i.e. the spring force of spring 60), piston 56 of differential pressure valve 26 will move downward to permit the oil to flow from the deaerator through conduit 24, through the differential pressure valve and out through outlet 64 to the reservoir. The pressure in the deaerator is determined by the amount of oil pumped from sump 14. Conversely, if the oil level in sump 14 (i.e. the oil of the lubricating system) falls below the preselected value, piston 56 will move upwardly under the spring rate of spring 60 to permit oil to flow back from accumulator 28, through the differential pressure valve 26, into the deaerator and out of the deaerator back to the lubricating system through lubricating circuit 36. This action resupplies oil to the compartment or housing containing the moving components and raises the oil level therewithin.

Figure 2:
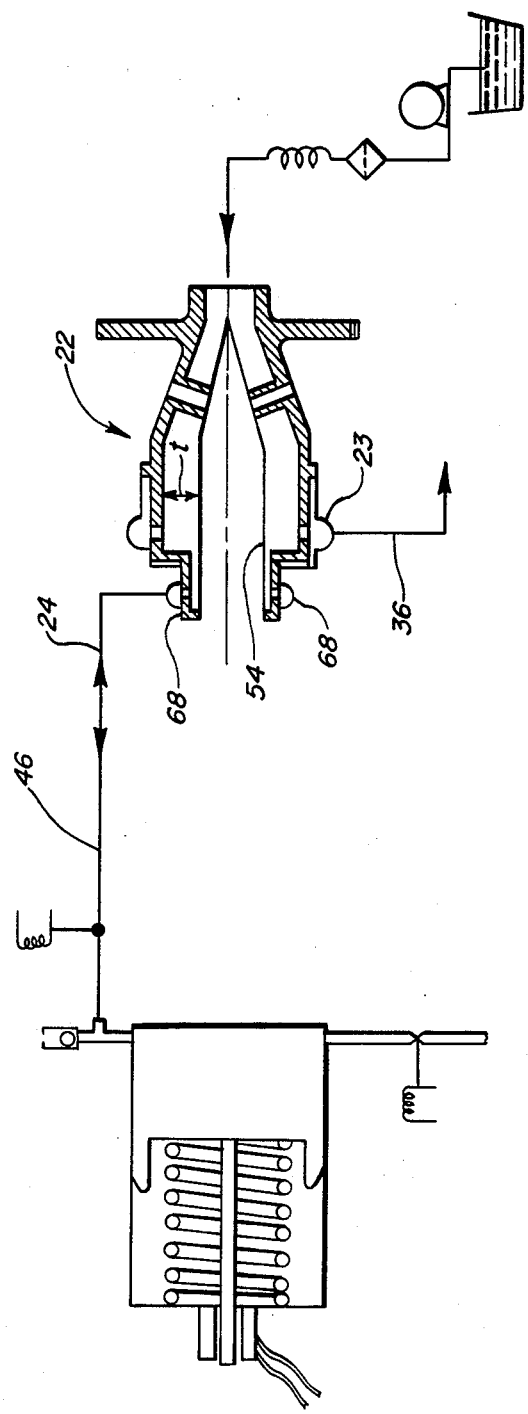
FIG. 2 is a schematic illustration of another embodiment of the system.

FIG. 2 shows another embodiment of the invention wherein a different type of sensing means is employed. Otherwise, like numerals have been applied to like elements corresponding to those described above in relation to FIG. 1.

Specifically, the embodiment of FIG. 2 eliminates the differential pressure valve 26 of the embodiment of FIG. 1, and employs sensing means in the form of an additional peripheral outlet means 68 in deaerator 22. This outlet communicates with conduits 24,46 which now are combined in a continuous conduit. It can be seen that outlet means 68 is located at a preselected radial location radially inwardly of outlet means 23 which no simply leads to lubricating circuit 36 back to the lubricating system. In essence, outlet means 68 defines the liquid level 54 within the deaerator.

In operation of the embodiment of FIG. 2, when the volume or level in deaerator 22 increases sufficiently to provide oil to outlet means 68, this excess oil is caused to flow to reservoir 28. However, when the volume or level of the oil within the centrifugally rotating deaerator falls below (i.e. radially outwardly of) outlet means 68, oil ceases to flow to reservoir 28 and, instead, oil flows back from the reservoir to the deaerator as a function of the spring force provided within the reservoir. Naturally, this spring force is determined by the size, shape add amount of oil body being worked upon within the deaerator.

Therefore, like the differential pressure valve 26 (FIG. 1), second outlet means 68 (FIG. 2) acts as a sensing means for sensing the liquid level condition within the deaerator, and providing for passage of liquid (oil) from the deaerator to the reservoir in response to a predetermined high level condition and for passage of liquid from the reservoir to the deaerator in response to a low level condition.

Figure 3:
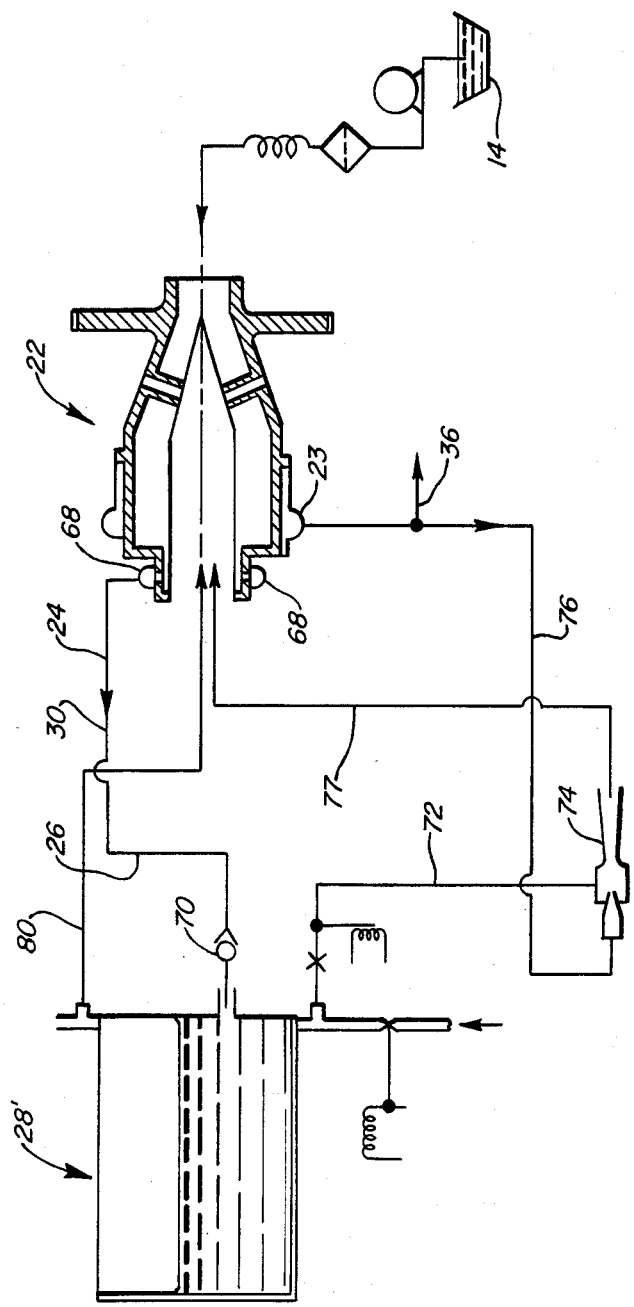
FIG. 3 is a schematic illustration of a further embodiment of the system.

FIG. 3 schematically illustrates a further embodiment of the invention which uses the sensing means afforded by second outlet means 68 described in relation to the embodiment of FIG. 2, but an accumulator 28' is provided of a non-pressurized-type. Again, like numerals have been applied to like elements in FIG. 3 corresponding to those described above in relation to FIGS. 1 and 2.

With the non-pressurized reservoir 28', a check valve 70 is disposed in conduit 24,26 such that liquid can only flow in the direction of arrow 30. In order to replenish the lubricating system with oil as sensed by outlet means 68, a separate conduit 72 is provided from reservoir 28' to an ejector 74. The ejector is continuously powered by pressurized liquid from outlet means 23, through a conduit 76 to the ejector and back to the deaerator through a conduit 77. Conduit 76 is shown as a branch off of the lubricating circuit 36 from the deaerator back to sump 14. In essence, the sensing means afforded by second outlet means 68 and ejector 74 are in a closed loop liquid circuit including reservoir 28' and deaerator 22. FIG. 3 also shows a siphon circuit 80 leading from reservoir 28' back to the center of deaerator 22 for passage of air. This maintains the reservoir in a truly non-pressurized condition.

Ejector 74 acts as an aspirator for transferring momentum from a high velocity stream, i.e. conduit 76 from outlet means 23, to pick up liquid from a low velocity stream, i.e. conduit 72 from non-pressurized reservoir 28'. This liquid circuit continuously feeds liquid back from reservoir 28' to deaerator 22. However, conduit 24,26 from deaerator 22 to reservoir 28' has a greater capacity than the ejector feedback circuit.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A liquid lubricant sump level management system, comprising:
   a scavenging circuit communicating with the lubricant sump;
   centrifugal deaerator means in the circuit;
   liquid reservoir means in liquid communication with the deaerator means; and
   sensing means operatively associated with the deaerator means for sensing the liquid level condition therein, and providing for passage of liquid from the deaerator means to the reservoir means in response to a high liquid level condition and for passage of liquid from the reservoir means to the deaerator means in response to a low liquid level condition.

2. The liquid lubricant sump level management system of claim 1 wherein said liquid reservoir means is pressurized.

3. The liquid lubricant sump level management system of claim 2 wherein said liquid reservoir means is spring loaded.

4. The liquid lubricant sump level management system of claim 1 wherein said sensing means include a differential pressure valve in-line between the deaerator means and the reservoir means.

5. The liquid lubricant sump level management system of claim 1 wherein said sensing means include a liquid outlet in the centrifugal deaerator means at a given radial location to determine the liquid accumulation level of the deaerator means.

6. The liquid lubricant sump level management system of claim 1, including ejector means in liquid communication between the reservoir means and the deaerator means for supplying liquid from the reservoir means back to the deaerator means.

7. The liquid lubricant sump level management system of claim 6 wherein said ejector means is in communication with a liquid outlet of the deaerator means so as to be continuously powered by the pressurized liquid from the dearator means.

8. The liquid lubricant sump level management system of claim 6 wherein the sensing means and the ejector means are in a closed loop liquid circuit including the reservoir means and the deaerator means.

9. A liquid lubricant sump level management system, comprising:
   a scavenging circuit communicating with the lubricant sump;
   centrifugal deaerator means in the circuit;
   a pressurized liquid reservoir means in liquid communication with the deaerator means; and
   a differential pressure valve in-line between the deaerator means and the reservoir means for sensing the liquid level condition of the deaerator means, and providing for passage of liquid from the deaerator means to the reservoir means in response to a high liquid level condition and for passage of liquid from the reservoir means to the deaerator means in response to a low liquid level condition.

10. The liquid lubricant sump level management system of claim 9 wherein said liquid reservoir means is spring loaded.

11. A liquid lubricant sump level management system, comprising:
   a scavenging circuit communicating with the lubricant sump;
   centrifugal deaerator means in the circuit;
   a pressurized liquid reservoir means in liquid communication with the deaerator means; and
   liquid outlet means in the centrifugal deaerator means at a given radial location to determine the liquid accumulation level in the deaerator means, thereby providing for passage of liquid from the deaerator means to the reservoir means and from the reservoir means to the deaerator means in response to the liquid level condition of the deaerator means.

12. The liquid lubricant sump level management system of claim 11 wherein said liquid reservoir means is spring loaded.

13. A liquid lubricant sump level management system, comprising:
   a scavenging circuit communicating with the lubricant sump;
   centrifugal deaerator means in the circuit;
   non-pressurized liquid reservoir means in liquid communication with the deaerator means;
   sensing means operatively associated with the deaerator means for sensing the liquid level condition therein, and providing for passage of liquid from the deaerator means to the reservoir means in response to a high liquid level condition and allowing for passage of liquid from the reservoir means to the deaerator means in response to a low liquid level condition; and
   ejector means in liquid communication between the reservoir means and the deaerator means for supplying liquid from the reservoir means back to the deaerator means in said low liquid level condition.

14. The liquid lubricant sump level management system of claim 13 wherein said ejector means is in communication with a liquid outlet of the deaerator means so as to be continuously powered by the pressurized liquid from the deaerator means.

15. The liquid lubricant sump level management system of claim 13 wherein the sensing means and the ejector means are in a closed loop liquid circuit including the reservoir means and the deaerator means.

* * * * *